Aug. 29, 1950 R. A. MOUNT 2,520,163
HAND OPERATED SEED PLANTER WITH ROTARY AGITATOR
Filed Dec. 18, 1944

INVENTOR.
Roy A. Mount
BY Victor J. Evans & Co.
ATTORNEYS

Patented Aug. 29, 1950

2,520,163

UNITED STATES PATENT OFFICE 2,520,163

HAND-OPERATED SEED PLANTER WITH ROTARY AGITATOR

Roy A. Mount, Pataskala, Ohio

Application December 18, 1944, Serial No. 568,732

1 Claim. (Cl. 222—242)

My present invention, in its broad aspect, has to do with improvements in dispensing top for containers for seeds, pills, capsules and other small objects. More particularly it is my purpose to provide a means on an inner cap for agitating the contents, and registering openings in the inner and an outer cap for dispensing the seeds or pills or other contents one (or more) at a time and directing them to the place desired, as for instance, in a row to be planted or the like.

In attaining the above and other objects and advantages, I provide a cylindrical container which may be of metal or other material and which has an open threaded dispensing end to receive thereover a threaded inner cap having a circular equally spaced series of instruck portions adjacent its edge to provide openings and inwardly extending projections functioning as agitators. This cap has an annular rib fitting into an annular groove in an outer cap to hold the outer rotatably on the inner cap. An opening is provided in the outer cap registering with the openings formed by the instruck portions in the inner cap to dispense the seeds, pills or other contents one at a time.

Additional objects and advantages will be apparent from the following description and drawings, but it is emphasized that changes in form, size, shape, materials and construction and arrangement of parts may be made provided same fall within the purview of my broad inventive concept, and the scope of the appended claim.

In the drawings wherein I have illustrated a preferred form of my invention:

In the drawings wherein like characters of reference are used to designate like or similar parts.

Figure 1:
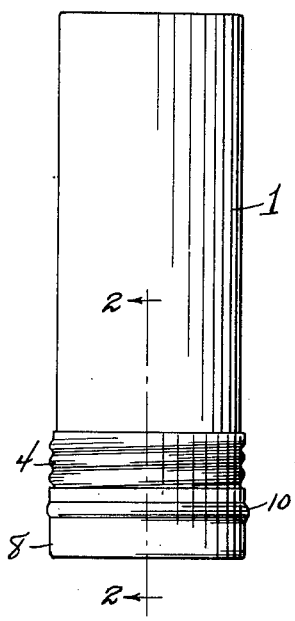
Figure 1 is a side elevation.
Figure 2:
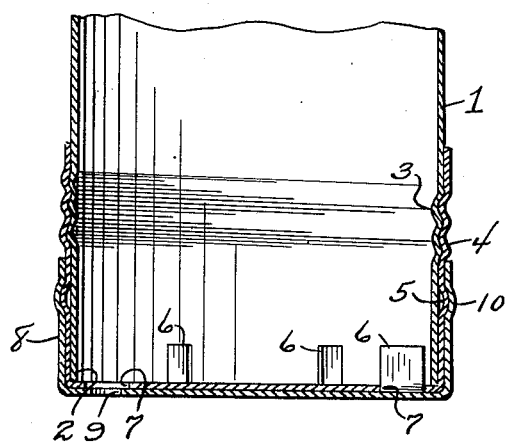
Figure 2 is an enlarged section taken on the line 2—2 of Figure 1.
Figure 3:
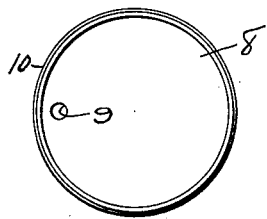
Figure 3 is a top plan view.
Figure 4:
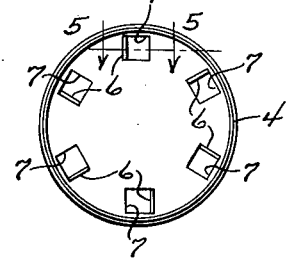
Figure 4 is a top plan view with the outer cap removed.
Figure 5:
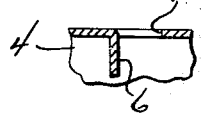
Figure 5 is a section on the line 5—5 of Figure 4.

The numeral 1 designates an elongated, cylindrical container formed of any suitable material and having an open end 2 with a threaded portion 3 spaced from the end. Engaged with the end 2 is a threaded inner cap 4 having an annular rib 5 between the top and the threads and a circularly arranged series of relatively and uniformly spaced rectangular instruck portions 6 forming openings 7 and providing blades for agitating the contents of the container which may be seeds, pills or the like (not shown). An outer cap 8 having a single opening 9 registering with the openings 7 is formed with a groove 10 engaging the rib 5 to rotationally mount the same on the inner cap. The opening 9 is smaller in size than the opening 7 to dispense one seed or pill at a time and to keep the openings clear.

In operation, the container 1 is held in a substantially upright position thereby causing the contents to gravitate against the bottom of the inner cap 4. Thus when the opening 9 of the outer cap 8 is placed under an opening 7, the contents will drop through the aligned openings 9 and 7 by gravity. To prevent the contents from packing together and blocking the openings, the inner cap 4 may be rotated back and forth on the threads 3. This will result in the cap 4 acquiring a compound motion; an up and down movement relative to the cylindrical container 1 and a rotational movement relative thereto. This compound motion is imparted to the instruck blades 6 which in turn will agitate the contents adjacent to the blades 6 to free the contents for passage through the openings 7 and 9. Hence, in the event it becomes desirable to agitate the container contents, the container 1 is grasped in one hand and the inner cap 4 is partially loosened and tightened on the threads 3 with the other hand. This in turn causing the blades 6 to disturb or break up the contents adjacent and against the blades 6. Rotation of the outer cap 8 on the annular rib 5 permits the user to move the opening 9 to a position between any adjacent pair of openings 7 to close off the container. Additionally, after the contents from one opening 7 ceases to flow, the opening 9 can be moved to the next opening 7 for draining off the agitated particles above it.

From the foregoing it is believed that the operation and advantages of my invention are apparent, but it is again emphasized that interpretation of the scope of my invention should only be conclusive when made in the light of the subjoined claim.

I claim:

A dispensing container comprising an inner cap having a bottom provided with a circularly-arranged series of openings, a series of blades attached to said bottom, said blades extending therefrom adjacent said respective openings and lengthwise of said inner cap, an external annular rib on said inner cap, an outer cap having an internal annular groove interfitting said annular rib whereby said outer cap is rotatably mounted on said inner cap, said outer cap having a bottom adjacent the inner cap bottom and provided with a discharge opening whereby relative rotation between said caps will place said discharge opening in selective alignment with the openings of said inner cap bottom, an elongated cylindrical container having an open end and a threaded portion adjacent said end, a threaded portion on said inner cap rotatably engaging the threaded portion on said container whereby relative rotation between said container and said inner cap causes the latter to rotate said blades and move the same lengthwise of said cylinder thereby agitating the contents of the same for discharge through said openings.

ROY A. MOUNT.

REFERENCES CITED

The following references are of record in the file of this patent:

UNITED STATES PATENTS

| Number | Name | Date |
|---|---|---|
| 251,923 | Newton | Jan. 3, 1882 |
| 953,300 | Schulz | Mar. 29, 1910 |
| 966,564 | Koegler | Aug. 9, 1910 |
| 1,124,523 | Reeser | Jan. 12, 1915 |
| 1,284,635 | Ford | Nov. 12, 1918 |
| 2,074,344 | Sacharow | Mar. 23, 1937 |
| 2,174,138 | Sage | Sept. 26, 1939 |